United States Patent [19]

Yunick

[11] Patent Number: 4,467,752
[45] Date of Patent: Aug. 28, 1984

[54] INTERNAL COMBUSTION ENGINE
[75] Inventor: Henry Yunick, Daytona Beach, Fla.
[73] Assignee: MotorTech, Inc., Daytona Beach, Fla.
[21] Appl. No.: 390,525
[22] Filed: Jun. 21, 1982
[51] Int. Cl.³ .............................................. F02B 17/00
[52] U.S. Cl. ................. 123/193 P; 123/307; 123/671; 123/193 H
[58] Field of Search ........... 123/193 R, 193 H, 193 P, 123/263, 307, 661, 671

[56] References Cited

U.S. PATENT DOCUMENTS

| | | | |
|---|---|---|---|
| 1,656,359 | 1/1928 | Moore | 123/658 |
| 1,656,360 | 1/1928 | Moore | 123/307 |
| 1,664,782 | 4/1928 | Madgeburger | 123/307 |
| 1,673,775 | 6/1928 | Moore | 123/193 P |
| 1,678,348 | 7/1928 | Moore | 123/260 |
| 1,708,425 | 4/1929 | Moore | 123/262 |
| 1,708,426 | 4/1929 | Moore | 123/307 |
| 1,708,427 | 4/1929 | Moore | 123/265 |
| 1,708,428 | 4/1929 | Moore | 123/265 |
| 1,717,578 | 6/1929 | Moore | 123/262 |
| 1,734,763 | 11/1929 | Dumanois | 123/657 |
| 1,734,764 | 11/1929 | Dumanois | 123/657 |
| 1,754,643 | 4/1930 | Moore | 123/262 |
| 1,798,967 | 3/1931 | Chedru | 123/193 R |
| 1,856,328 | 5/1932 | French | 123/307 |
| 1,901,448 | 3/1933 | High | 123/55 A |
| 2,172,170 | 9/1939 | Megroot | 123/263 |
| 2,231,392 | 2/1941 | McCarthy | 123/50 R |
| 2,346,021 | 4/1944 | Godfrey | 123/262 |
| 2,662,517 | 12/1953 | Bodine | 123/193 CP |
| 2,709,992 | 6/1955 | Graves | 123/193 R |
| 2,766,738 | 10/1956 | Hoffman | 123/269 |
| 2,827,033 | 3/1958 | Bodine | 123/660 |
| 3,766,900 | 10/1973 | Aiti | 123/193 M |
| 3,875,909 | 4/1975 | May | 123/262 |
| 4,000,722 | 1/1977 | May | 123/263 |
| 4,094,272 | 6/1978 | May | 123/263 |
| 4,121,544 | 10/1978 | May | 123/263 |
| 4,125,105 | 11/1978 | May | 123/265 |
| 4,162,661 | 7/1979 | Nakanishi et al. | 123/193 P |
| 4,166,436 | 9/1979 | Yamakawa | 123/193 R |
| 4,357,915 | 11/1982 | Monsour | 123/307 |

FOREIGN PATENT DOCUMENTS

| | | | |
|---|---|---|---|
| 2728903 | 1/1979 | Fed. Rep. of Germany | |
| 802762 | 9/1936 | France | 123/307 |
| 1131285 | 2/1957 | France | 123/661 |
| 1373853 | 8/1964 | France | 123/193 P |

Primary Examiner—Craig R. Feinberg
Attorney, Agent, or Firm—Watts, Hoffmann, Fisher & Heinke Co.

[57] ABSTRACT

An internal combustion engine having a cylinder 16, a cylinder head 10, and a piston 12 slidably mounted within the cylinder for reciprocating movement towards and away from the cylinder head, together defining a reaction chamber 22. The piston and cylinder head include cooperating structure for inducing rotative movement in a fuel/air mixture within the cylinder before and after the combustion reaction. The structure comprises at least two projections 50, 51 rising upwardly from a top the surface of the piston and disposed symmetrically about a central axis in a side-by-side interfitting, "yin and yang" relationship. The projections are defined by respective inclined, lateral surfaces 50a, 51a that merge with horizontal surface portions 58, 59 of the piston, the horizontal extent of which taper from the base of the associated projection; the upper portion of the projections terminate in respective circular edge surfaces 56, 57. The cylinder head includes an inner peripheral wall 20 that forms at least a portion of the combustion chamber and defines complementary shaped recesses 52, 53 for receiving the respective piston projections 50, 51 when the piston is substantially at top dead center. The recesses have portions that are contoured substantially similar to the contour of the sloping projection surfaces 50a, 51a. When embodied on an internal combustion engine having poppet-type intake and exhaust valves, the valve heads 24, 26 of the valves define portions of the recesses.

19 Claims, 8 Drawing Figures

INTERNAL COMBUSTION ENGINE

DESCRIPTION

1. Technical Field

The present invention relates generally to internal combustion engines and in particular to a method and apparatus for improving combustion efficiency.

2. Background Art

Throughout the history of the internal combustion engine including both the spark ignition and compression-ignition types, devices and/or engine constructions have been suggested to improve the quality of combustion. In today's energy conscious world, maximizing the energy obtained from a given amount of fuel while minimizing pollution of the environment by engine exhausts is of great concern. Engine designers generally believe that fuel economy can be increased and exhaust emissions reduced, especially hydrocarbon pollution, by enhancing the combustion process so that the fuel mixture is completely reacted prior to being exhausted.

Methods and apparatus for improving combustion efficiency have been suggested in the past. Many of these suggested improvements, have been found unworkable, impractical and/or uneconomical. In the past, it is believed that in many cases, the cost of modifying existing engines or adding a suggested apparatus, has greatly exceeded the value of the benefits realized. Although the automobile industry today is often willing to pay a premium for devices and methods for improving engine efficiency, it is more desirable to develop inexpensive apparatus and methods, if possible.

In the past one frequently suggested method for enhancing the combustion process was to cause turbulence of the fuel/air mixture within the combustion chamber to insure thorough mixing of the mixture constituents. This turbulence, sometimes termed "swirl", was acheived in a variety of ways by the prior art. For engines employing poppet type valves for admitting and exhausting gases from the combustion chamber, orientation of the intake port and intake passage was suggested. In some proposals, the introduction of the fuel/air mixture into the chamber along a path substantially tangential to the piston cylinder was intended to cause swirl of the mixture as it entered the chamber. It should be recognized, that with these suggested methods, if swirl occurred at all it would be imparted to the mixture only during the intake stroke of the engine and once the intake valve closed, no further motion in the mixture would be imparted by the piston or the combustion chamber.

A second suggested method for producing turbulence or swirl in the mixture was the incorporation of projections on the piston and/or combustion chamber which according to purveyors of these techniques, were said to induce turbulence in the mixture as the piston moved to reduce the combustion chamber. Most of these swirl inducing shapes were rather complex and required expensive machining for both the piston and the cylinder head. Spiral as well as helical shaped surfaces were suggested. It is believed that none of these suggested piston/chamber shapes met with any great degree of acceptance due to excessive cost of implementation.

Still other suggested prior art arrangements included piston shapes and combustion chamber configurations intending to create "squish" areas within the chamber when the piston was substantially at top dead center. These squish areas were said to be formed by varying the piston to combustion chamber wall clearance so that pockets of high and low pressure were developed during the compression stroke. As the piston would approach top-dead-center, assertedly the fuel/air mixture would be "squirted" from the area of high pressure to the area of low pressure. In this suggested method, turbulence is induced in the mixture during the compression stroke, but it is believed that a sustained, uniform motion in the mixture is not achieved. The turbulence in general is random and thus is quickly dissipated.

DISCLOSURE OF THE INVENTION

The present invention provides a new and improved method and apparatus for enhancing the process reacting a fuel air/air mixture in an internal combustion engine. According to the preferred embodiment, the engine comprises at least one cylinder, a cylinder head and a piston slidably supported in the cylinder for reciprocating movement toward and away from the cylinder head. The cylinder head includes an inner peripheral wall that together with the piston, defines the ends of a combustion chamber. According to the invention, the piston and combustion chamber include structure for inducing rotative movement in the fuel mixture during compression and power strokes of the piston.

In the preferred and illustrated embodiment, the structure for inducing rotation comprises at least two projections rising upwardly from a top surface of the piston and complemental shaped recesses formed in the combustion chamber. The projections are disposed symmetrically about the axis of the piston and each projection defines a gradual sloping, ramp-like top surface that extends downwardly from a top peripheral edge of the projection to the top surface of the piston. The projections are contoured so that a major portion of their outer edges conform substantially to the circumferential surface of the piston.

In the disclosed embodiment, the cylinder head includes poppet type intake and exhaust valves that extend into the combustion chamber and control the inflow of fuel mixture and the outflow of the combustion products. According to the preferred embodiment, the valve head of the intake valve is disposed in one recess and at least partially defines an inclined surface forming part of the recess. The valve head of the exhaust head is similarly situated in the other recess. Preferably, the valve heads are canted at opposed angles, so that the plane of the valve heads forms an angle of substantially 15° with respect to a horizontal top surface portion of the piston. With the piston oriented vertically, the axes of the valves are angled substantially 15° from the vertical.

In the exemplary embodiment, the projections are disposed on top of the piston in a side-by-side, interfitting relationship. Each projection is contoured so that the lateral extent of the piston top surface portions, adjacent each projection, gradually tapers beginning at the base of the other projection. A top peripheral edge of each projection is arcuate so that viewed in plan, the top of the piston appears to include a pair of interfitting, curved tear-drop shaped surfaces arranged in a "Yin and Yang" relationship.

The inner peripheral wall of the cylinder head and the top of the piston are configured so that the clearance between the recesses and the upper portions of the projections differs from the clearance between the substantially horizontal portions of the piston top surface and the substantially horizontal, planar surfaces defined by the cylinder head. It is believed, that during operation, the clearance differences generate regions of high and low pressure in the combustion chamber. During the compression stroke, as the piston reaches top dead center, the portions of the compressed fuel mixture in the high pressure areas move towards the areas of low pressure.

In the illustrated embodiment, the clearance between the sloping surface of each projection and the corresponding inclined surfaces defined by each recess is greater than the clearance between the horizontal portions of the piston and the planar surfaces of the cylinder head. With this construction, regions of high pressure are generated at the base of each projection causing the compressed fuel mixture located in these areas to travel upwardly along the sloping projection surfaces. The outer side surfaces of each projection substantially conform to the circumferential surface of the cylinder and consequently the mixture is induced to travel in an arcuate path, along the top surface of each projection.

Testing of an internal combustion chamber and piston configuration embodying the present invention, has confirmed the rotational movement in the fuel mixture during both the compression and power strokes of the piston. It is believed, once motion in the fuel mixture is imparted during the compression stroke, the kinetic energy of the mixture constituents causes the mixture to continue rotating throughout the power stroke. Moreover, it is also believed that during the combustion process, the same areas of low and high pressure created by the piston cylinder head structure also promote rotative movement in the reacting mixture during the power stroke.

Unlike the prior art, the present invention induces a continuing rotational movement in the fuel mixture during both the compression and power strokes. This rotational movement enhances and promotes combustion efficiency.

With the present invention, the reacted fuel/air mixture tends to remain separated from the combustion byproducts during the reaction process. It is believed that this separation increases reaction efficiency and allows the use of leaner fuel mixtures thus increasing fuel economy. According to the preferred embodiment, ignition of the fuel mixture is effected at the top of the combustion chamber at or near the rotational axis defined by the rotating fuel mixture. The centrifugal forces generated due to the rotation of the fuel mixture and reactive byproducts drives the heavier constituents outwardly leaving the lighter components near the axis of rotation. The reaction byproducts or exhaust gases are generally lighter than the unreacted fuel mixture and thus the exhaust gases remain concentrated near the axis of rotation whereas the unreacted fuel/air mixture tends to be driven towards the periphery of the cylinder. It is believed that the fuel/air mixture and exhaust byproducts tend to remain separate throughout the reaction. Consequently, the unreacted mixture is not diluted by the exhaust gases and a relatively constant fuel/air ratio is maintained throughout the cylinder during combustion resulting in a more complete reaction. It is believed, in more conventional internal combustion engines, the dilution of the fuel/air mixture by the exhaust byproducts during the reaction process terminates the reaction prematurely because the fuel/air ratio near the cylinder wall falls below the stoichiometric ratio due to dilution by the exhaust gases and as a result is no longer able to maintain combustion.

It is also believed that dilution of the fuel/air mixture is inhibited by a pressure front generated during the reaction. Immediately after ignition, a spiralling generally circular reaction front is formed that propagates radially towards the cylinder wall. This cylindrical reaction front defines a region of high pressure that divides the unburned fuel mixture, located between the front and the cylinder wall, from the products of combustion located centrally of the cylinder, and isolated from the rest of the cylinder by the continuous front. The extremely high pressures generated in this expanding reaction front or wall of flame, prevents movement of fuel mixture and/or exhaust products across its boundary.

In the illustrated embodiment, the mixture ignition device comprises an electric igniter such as a spark plug, located between the intake and exhaust valves and is preferably spaced laterally from an imaginary line connecting the axis of the intake and exhaust valves. The spark plug is preferably located so that it is in the path of the rotating fuel mixture flowing from the recess containing the intake valve to the recess containing the exhaust valve. With this configuration, the incoming fuel mixture tends to clean and cool the (spark plug) igniter tip and also assures that an undiluted fuel mixture surrounds the (plug) igniter during ignition.

Although in the disclosed construction, the invention is embodied on a single cylinder, four cycle engine having poppet type intake and exhaust valves, the principles of the invention are adaptable to a wide variety of engine styles and configurations. The invention can improve the operating efficiency of four cycle as well as two cycle single and multi-cylinder engines and can be used on engines having other valve configurations (such as rotary valves) including engines utilizing port-type valving usually found on two cycle internal combustion engines.

Additional features will become apparent and a fuller understanding of the present invention will be obtained in reading the following detailed description made in connection with the accompanying drawings.

BEST MODE FOR CARRYING OUT THE INVENTION

Figure 1:
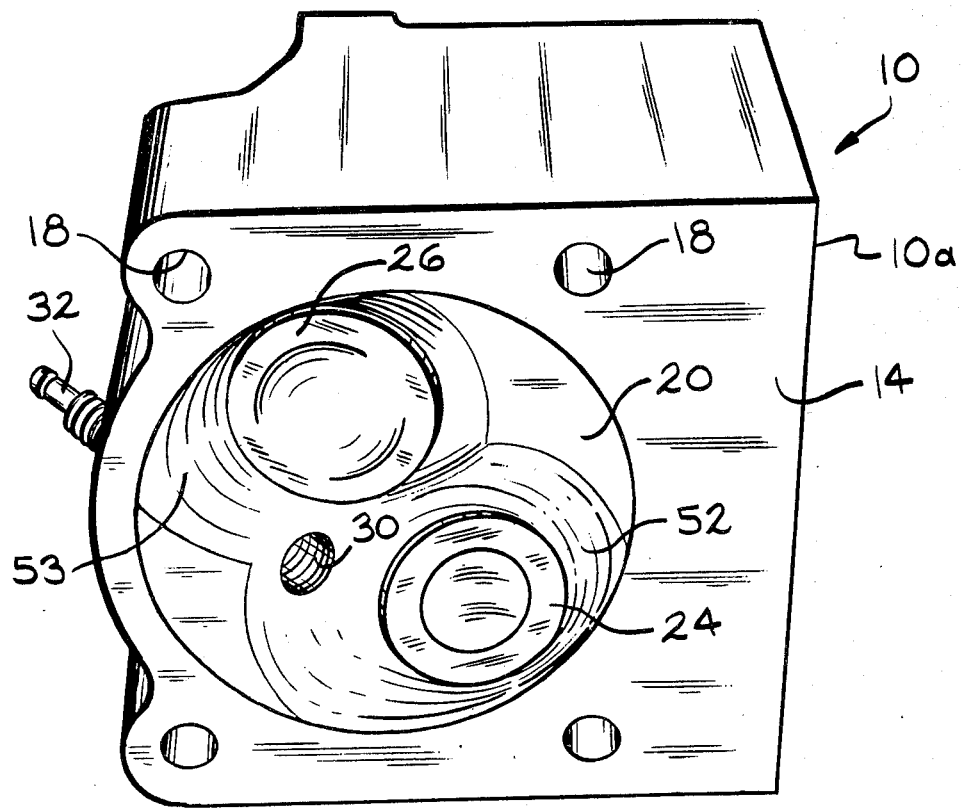
FIG. 1 is a perspective view of an underside of a cylinder head constructed in accordance with the preferred embodiment of the invention.
Figure 2:
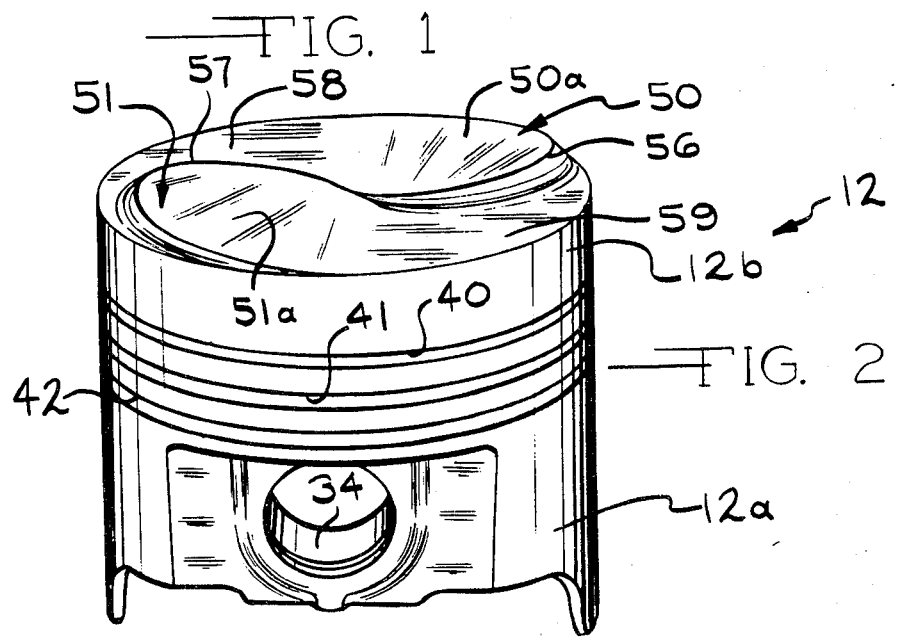
FIG. 2 is a perspective view of a piston constructed in accordance with the preferred embodiment of the invention.

A cylinder head 10 and piston 12 illustrated in FIGS. 1 and 2 respectively, form part of an internal combustion engine constructed in accordance with the preferred embodiment of the invention. Although in the illustrated embodiment, only a single piston and cylinder head are shown, those skilled in the art will recognize that the principles of the invention are applicable to either two or four cycle internal combustion engines in general having one or more cylinders. The cylinder head 12 includes a rigid casting 10a that defines a sealing surface 14 for sealingly engaging a cylinder block 16 (shown in FIGS. 5 and 6) that defines an internal cylinder wall 16a. Apertures 18 extend through the casting and receive fasteners by which the head 10 is clamped to the cylinder 16.

Figure 6:
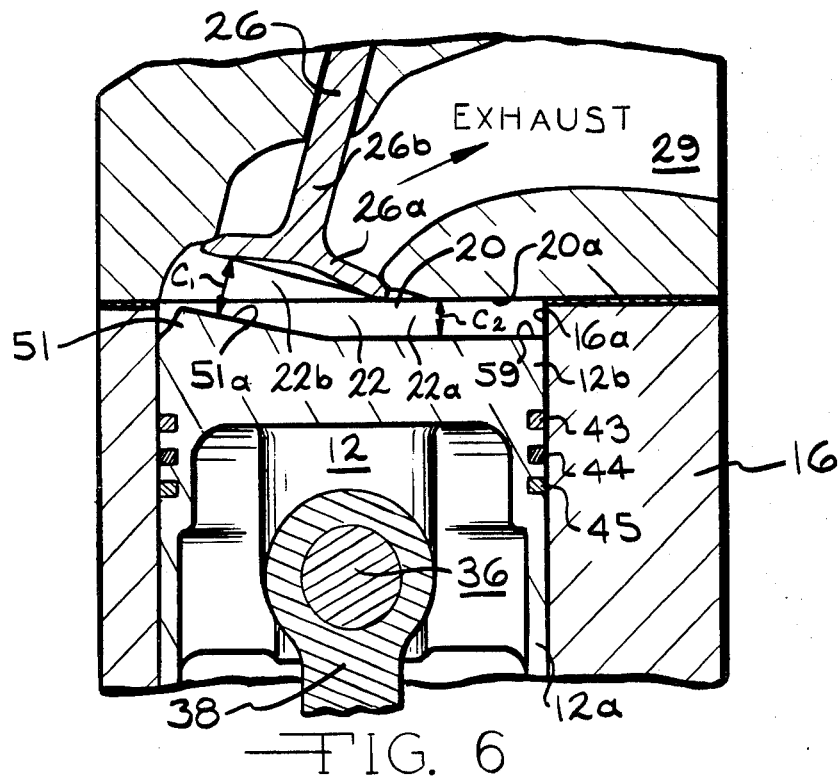
FIG. 6 is a sectional view of the engine assembly as it would be seen from a plane indicated by the line 6—6 in FIG. 3.
Figure 5:
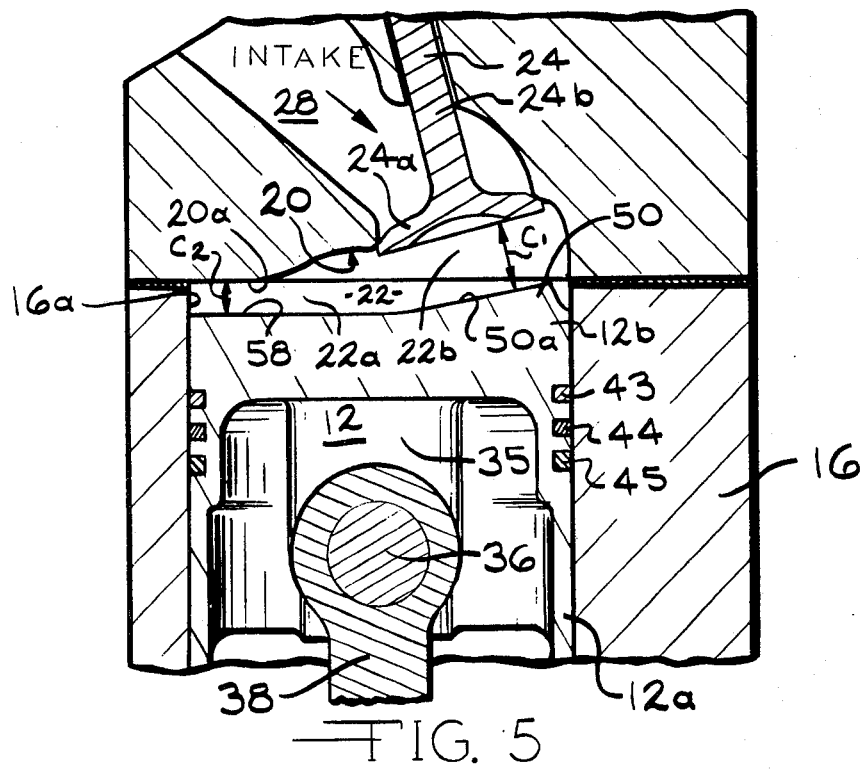
FIG. 5 is a sectional view of an engine assembly including the cylinder and piston illustrated in FIGS. 1 and 2, respectively as it would be seen from a plane indicated by the line 5—5 in FIG. 3.

Referring also to FIGS. 5 and 6, according to the invention, the cylinder head 10 defines a combustion chamber wall 20 which together with the piston 12 and cylinder block 16 defines a combustion chamber 22. The cylinder head 12 slidably mounts conventional poppet-type intake and exhaust valves 24, 26 which control the communication between respective intake and exhaust passages 28, 29 defined by the cylinder head 10, and the combustion chamber 22. A threaded bore 30 (shown in FIGS. 1 and 3) opens into the combustion chamber and serves to mount a mixture ignition device such as a spark plug 32, shown in FIG. 1.

Figure 7:
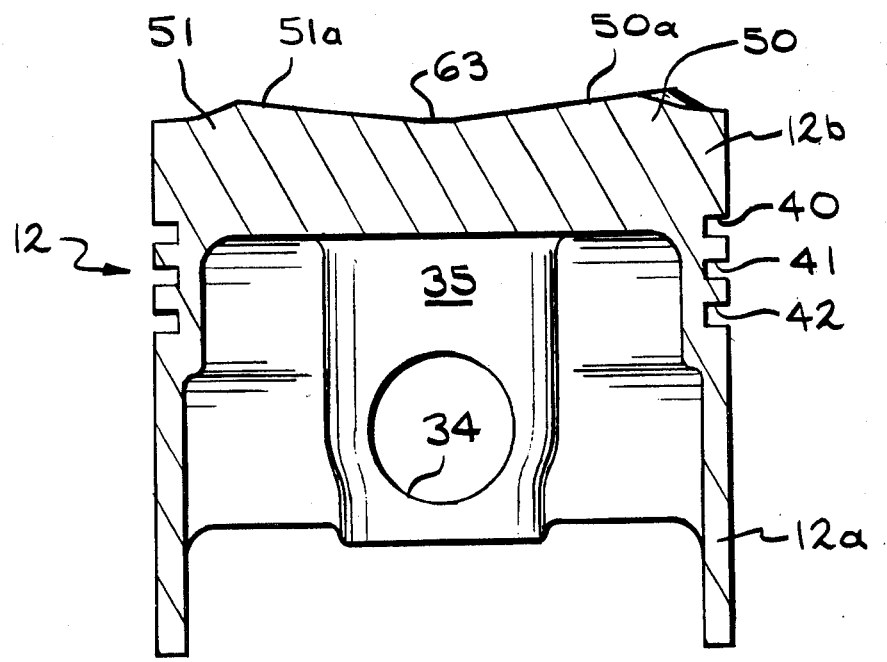
FIG. 7 is a sectional view of the piston as seen from a plane indicated by the line 7—7 of FIG. 4; and, FIG. 8 is another sectional view of the piston as seen from the plane indicated by the line 8—8 of FIG. 4.
Figure 8:
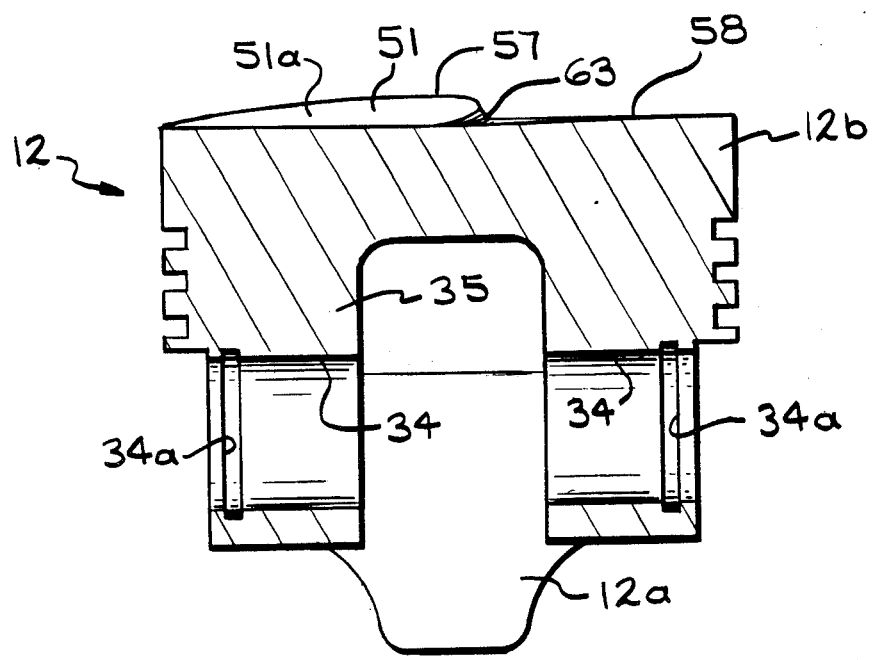

The piston 12 includes a conventional piston skirt 12a and a piston crown 12b constructed in accordance with the invention. The piston skirt 12a defines spaced, aligned bores 34, formed in spaced apart webs 35 (see FIGS. 7 and 8) which receive a wrist pin 36 by which a connecting rod 38 is pivotally connected to the piston (shown in FIGS. 5 and 6). Grooves 34a (shown only in FIG. 8) are formed at the outer ends of the bores 34 and receive lock rings to secure the wrist pin 36 in position. A plurality of annular, circumferential grooves 40–42, formed around the periphery of the piston, support piston rings 43–45 (shown in FIGS. 5 and 6) which may comprise both compression and oil control rings.

Figure 4:
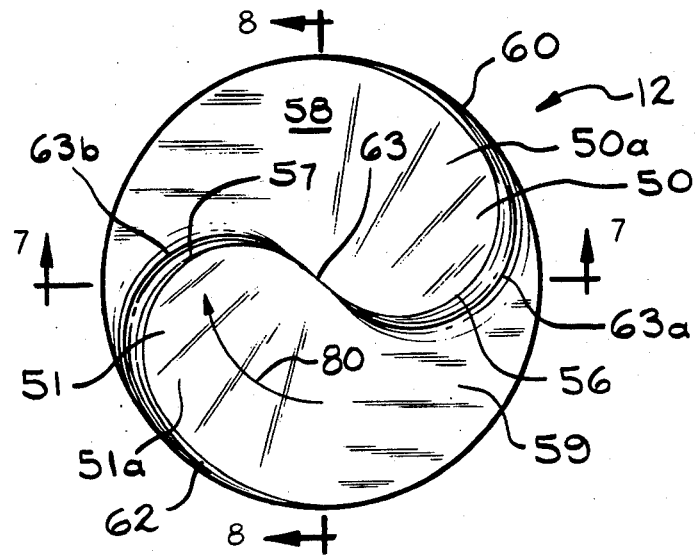
FIG. 4 is a top plan view of the piston shown in FIG. 2.

In accordance with the present invention, two ramp-like projections 50, 51 are formed on the top of the piston crown 12b. Complemental shaped recesses 52, 53 are formed in the combustion chamber wall 20 and are arranged to receive the projections 50, 51, respectively, when the piston 12 is at top-dead-center (TDC). Referring also to FIG. 4, the projections 50, 51 define gradually sloping surfaces 50a, 51a, that extend downwardly from arcuate, leading peripheral edges 56, 57 to substantially horizontal piston crown surfaces 58, 59, respectively, of the piston crown 12b.

As best seen in FIG. 4, the outer periphery of the projections 50, 51 are preferably defined by contoured edges 60, 62 that conform substantially to the piston circumference. In the illustrated embodiment, the inner periphery of the projections 50, 51 is defined by a common boundary line 63 that merges into contoured boundary lines 63a, 63b, which define the base of the projections 50, 51, respectively. With this construction, the projections 50, 51 are disposed in a close fitting, side-by-side arrangement, symmetrical about the central axis of the piston. In this preferred embodiment, the lateral extent of the horizontal surfaces 58, 59 gradually tapers from the termination of the respective projections. Viewed in plan (as seen in FIG. 4), the top of the piston appears to define a pair of interfitting, curved tear-drop shaped surfaces arranged in a "Yin and Yang" relation.

Figure 3:
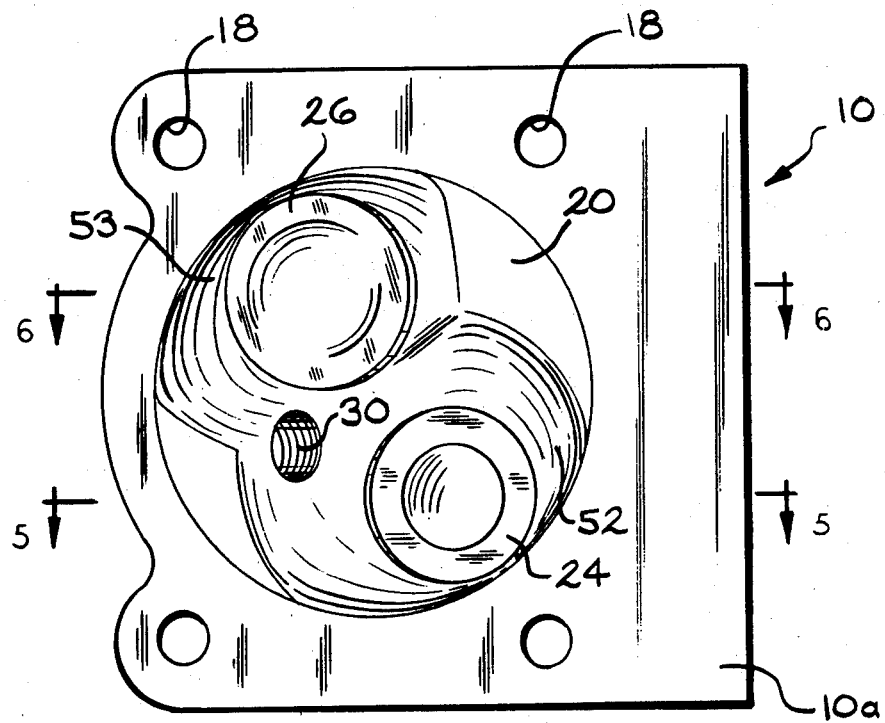
FIG. 3 is a bottom, elevational view of the cylinder head shown in FIG. 1.

Turning now to FIGS. 3, 5 and 6, the recesses 52, 53 define inclined surfaces that in the illustrated embodiment substantially parallel the sloping surfaces 50a, 51a of the associated piston projections 50, 51. In the preferred embodiment, valve heads 24a, 26a of the intake and exhaust valves 24, 26, at least partially define the recesses 52, 53, respectively. As seen in FIGS. 5 and 6, the intake and exhaust valves 24, 26 are canted so that the under surfaces of the valve heads 24, 26 are disposed in planes substantially parallel to the sloping surfaces 50a, 51a of the associated projections 50, 51, respectively.

In the illustrated and preferred embodiment, the piston surfaces, recesses and valves are arranged so that regions of low and high pressure are generated in the combustion chamber 22 as the piston approaches top-dead-center. As seen best in FIGS. 5 and 6, the clearance "$C_1$" defined between the bottom of the valve heads 24a, 26a and sloping projection surfaces 50a, 51a are selected to be different from the clearance "$C_2$" between the top surfaces 58, 59 of the piston 12 and horizontal undersurface portions 20a, of the combustion chamber wall 20.

During engine operation, as the piston 12 approaches top-dead-center, regions of high and low pressures 22a, 22b will develop in the combustion chamber 22 between the cylinder head surfaces 20a and the piston top surfaces 58, 59 and between the projections 50, 51 and the valve heads 24a, 26a, respectively. This dynamic pressure differential, will cause the fuel mixture trapped between the surfaces 20a, 58, 59 (the high pressure regions 22a) to travel towards the regions of lower pressure 22b, i.e., upwardly along the sloping projection surfaces 50a, 51a of the projections 50, 51. As indicated in FIG. 4, the actual motion of the fuel mixture along the projections is in the nature of rotation about the piston axis as designated by the arrow 80. The concurrent generation of movement along each projection 50, 51 produces an overall rotative movement in the fuel mixture within the cylinder. Once the fuel mixture constituents are set in motion, the kinetic energy imparted causes the mixture to rotate during combustion and throughout the power stroke.

It is believed that the centrifugal forces developed as a result of rotation of the reacted and unreacted mixture during the combustion process enhances the overall operation of the invention. In the absence of rotation, as is the case in most conventional internal combustion engines, the burned and unburned fuel mixture components intermix during combustion or, in effect, the products of combustion dilute the unburned fuel mixture. This expected dilution normally mandates a richer fuel mixture than necessary in order to maintain combustion.

With the present invention, the problem of "charge dilution" is substantially reduced. The centrifugal forces generated by the rotating air/fuel mixture both before and during the reaction tends to concentrate the lighter constituents near the axis of rotation and to drive the heavier components towards the periphery of the cylinder. During the reaction, the byproducts or exhaust gases are generally lighter and therefore tend to remain near the center of the piston whereas the heavier air/fuel mixture is driven outwardly towards the cylinder walls. The centrifugal forces tend to prevent comingling or dilution of the air/fuel mixture by the reaction byproducts. As a result, the fuel-to-air ratio remains relatively constant throughout the cylinder during the entire reaction process. The stoichiometric ratio is maintained, even at the cylinder walls, and therefore the reaction does not terminate prematurely.

Dilution of the fuel/air mixture and exhaust byproducts is also inhibited by a circular pressure front that is established during the reaction process due to the rotation of the fuel/air mixture. Immediately after ignition commences (as initiated by the spark plug 32) a spiralling wall of flame begins propagating radially from the point of ignition, which is preferably located near the rotational axis defined by the rotating fuel mixture, towards the cylinder wall 16a. The wall of flame defines a region of extremely high pressure which separates the unburned fuel mixture located between the flame wall and the cylinder wall 16a from the burned products located inside the flame wall. The high pressure prevents the unburned mixture and the products of combustion from crossing the flame front and thus the unreacted and reacted constituents remain separated during the combustion process. It is believed that by preventing the comingling of these constituents, a leaner fuel/air mixture can be reliably reacted without degrading engine performance or operation.

As seen in FIGS. 1 and 3, the spark plug 32 is oriented so that its electrode (not shown) is positioned a spaced distance from an imaginary line connecting the axes of the valves 24, 26. In other words, the spark plug electrode is spaced, or offset, from the center of the cylinder. With the disclosed spark plug positioning, rotation of the mixture during the compression stroke tends to promote cooling and cleaning of the spark plug electrode.

Returning to FIGS. 5 and 6, a uniform clearance "$C_1$" between the bottom of the valve heads 24a, 26a and the projection surfaces 50a, 50b is illustrated. In the embodiment shown, the axes of the valves 24, 26 (as defined by valve stems 24b, 26b) define angles of inclination of substantially 15° with respect to the vertical as viewed. It should be apparent, that the angle of inclination of the valves 24, 26 or the slope of the projection top surfaces 50a, 51a can be altered to define a gradually decreasing clearance in the region 22b of the combustion chamber, to further promote movement in the fuel mixture. Alternately, the clearance "$C_1$", "$C_2$" can be selected so that the clearance $C_2$ (in the region 22a) is greater than the clearance $C_1$ (in the region 22b) so that reverse rotation of the mixture can be effected.

Although the invention has been described with a certain degree of particularity, it should be understood that various changes can be made to it by those skilled in the art without departing from the spirit or scope of the invention as described and hereinafter claimed.

1. In an internal combustion engine having a cylinder, a cylinder head and a piston mounted within said cylinder for reciprocating movement towards and away from said cylinder head, structure for inducing rotative movement in a fuel/air mixture within the cylinder, prior to and after combustion, comprising:
   (a) at least two substantially similar projections rising upwardly from a top surface of said piston, said projections disposed symmetrically about a central axis of said piston and disposed in a side-by-side, interfitting yin and yang relationship, said projections at least partially defined by a common contoured boundary line that intersects the central axis of the piston, each projection including an inclined, lateral surface, that merges with horizontal surface portions of said piston having a horizontal extent of said surface portions decreasing from a base of the associated projection, and an upper portion of each projection terminating in a circular edge surface said projections and piston top surface act as means for inducing said rotative movement wherein said rotative movement formed thereby goes about the axis across all of said projections and piston top surface;
   (b) said cylinder head defining a wall of a combustion chamber, said wall including recesses shaped to receive the projections on said piston when said piston is located at top-dead-center.

2. The structure of claim 1 wherein said cylinder head includes at least one intake and one exhaust valve inclined with respect to said piston axis, and wherein valve heads of said intake and exhaust valves at least partially define said recesses.

3. In an internal combustion engine including at least one cylinder, a reciprocatable piston mounted therein and a head closing the cylinder such that the piston, cylinder and head define a reaction chamber of variable volume, the improved piston and head configuration comprising:
   (a) the piston having at least two substantially similar projections each including a first upwardly spiralling surface commencing at a first locus near a perimeter of the piston and being outwardly bounded over a substantial circumferential first part;
   (b) the spiralling surface having one portion of increasing radial dimension as measured commencing at said locus and then moving in a rotative direction along said circumferential first part;
   (c) each projection having a second and more steeply inclined surface mating with the first surface at an intersection.
   (d) the second surface commencing at a second locus near an end of the first part spaced from the first locus;
   (e) the intersection of the first and second surfaces spiralling in said rotative direction gradually inwardly from the second locus to a curved end section;
   (f) the second surface having a base with one section of the base commencing near the second locus and extending along a second circumferential part to a location near the first locus of the other projection;
   (g) the second surface base having another section extending spirally from said location to a termination near the piston axis;
   (h) said first surface including another portion spiralling upwardly and smoothly from its said one portion to said intersection;
   (i) said projections together defining substantially the entire reaction chamber surface of the piston; and,
   (j) the cylinder head having recesses contoured substantially complementally to said piston surfaces, said recesses and piston surfaces act as means for imparting relative movement to a fuel air mixture in the reaction chamber during compression and power portions of the engine operation, wherein said rotative movement formed thereby goes about the axis of the piston, across all of said projections and reaction chamber surfaces.

4. The engine of claim 3 wherein intake and exhaust valves are provided and wherein surfaces of said valves define portions of said recesses during said compression and power portions.

5. The engine of claim 3 wherein an igniter is mounted in the head and in communication with the chamber.

6. The engine of claim 3 wherein said one portion of each first surface is closer to the recess complemental surface than said another portion of its first surface.

7. An internal combustion engine, comprising:
(a) a cylinder;
(b) a piston mounted for reciprocating movement within said cylinder;
(c) a cylinder head mounted at one end of said cylinder and at least partially defining a combustion chamber when said piston is substantially at top-dead-center;
(d) said piston including structure for inducing rotative movement in a fuel mixture inducted into said combustion chamber during both a compression and power stroke of said piston;
(e) said structure comprising two substantially similar circumferentially disposed spiral projections extending upwardly from a top surface of said piston and arranged in a yin and yang relationship, said projections at least partially defined by a common contoured boundary line that intersects the central axis of the piston, said projections each defining a gradual sloping top surface that extends downwardly from a top peripheral edge of the projection to the top surface, said projections and piston top surface act as means for inducing said rotative movement wherein said rotative movement formed thereby goes about the axis across all of said projections and piston top surface;
(f) a cylinder head including an inner peripheral wall defining at least a portion of a combustion chamber, said peripheral wall including complementally shaped recesses for receiving said projections when the piston is substantially at top-dead-center said recesses including portions having a contour substantially similar to that of said gradually sloping projection surfaces.

8. The structure of claim 7 wherein said cylinder head includes inclined intake and exhaust poppet valves, said valves positioned so that valve heads of said valves at least partially define said recesses.

9. The apparatus of claim 8 wherein said valves are inclined at opposed angles and said valve heads having undersurfaces which are disposed in a plane substantially parallel to the top surfaces of respective projections.

10. The apparatus of claim 8 wherein the intake and exhaust valves are each associated with a different one of the projections.

11. The apparatus of claim 8 wherein said projection surfaces are curvingly tapered from the top peripheral edge to the top surface of the piston.

12. The apparatus of claim 8 further comprising a mixture ignition device extending into said combustion chamber and positioned between said intake and exhaust valves and spaced laterally from an imaginary line connecting the centers of said valves.

13. In an internal combustion engine including at least one cylinder, a reciprocatable piston mounted therein and a head closing the cylinder such that the piston, cylinder and head define a reaction chamber of variable volume, the improved piston and head configuration comprising:
(a) the piston having a pair of substantially similar projections each including a first upwardly spiralling surface commencing at a first point along a perimeter of the piston and being outwardly bounded by the piston perimeter over a first and substantial circumferential part of the perimeter, the first point of one of the projections being diametrically opposite to the first point of the other projection;
(b) the spiralling surface having one portion of steadily increasing radial dimension as measured commencing at said point and then moving in a rotative direction along said first circumferential part;
(c) each projection having a second and more steeply inclined surface mating with the first surface at a curvilinear intersection;
(d) the second surface of each projection commencing at a second perimetral point at the end of the first part spaced from the first point;
(e) the intersection of the first and second surfaces spiralling in said rotative direction gradually inwardly from the second point to the semi-circular end section of a diameter substantially equal to the radius of the piston;
(f) the second surface of each projection having a base with one section of the base commencing at its second point, the second surface of the one projection extending along a second circumferential part to the first point of the other projection and the second surface of the other projection extending along a second circumferential part to the first point of the one projection;
(g) each second surface base having another section extending spirally from its said one section to a termination at an intersection with the piston axis, said another section of the one projection base defining the inward extremity of said one portion of the first surface of the other projection and said another section of the other projection base defining the inward extremity of said one portion of said one projection;
(h) each of said first surfaces including another portion spiralling upwardly and smoothly from its said one portion to its said intersection;
(i) said two projections together defining the entire reaction chamber surface of the piston; and,
(j) the cylinder head having recesses contoured substantially complemental to said piston surfaces, said recesses and piston surfaces act as means for imparting relative movement to a fuel air mixture in the reaction chamber during compression and power portions of the engine operation, wherein said rotative movement formed thereby goes about the axis of the piston, across all of said projections and reaction chamber surfaces.

14. The apparatus of claim 7 or 13 wherein said spiral projections are arranged in a yin and yang relationship.

15. The engine of claim 13 wherein intake and exhaust valves are provided and wherein surfaces of said valves define portions of said recesses during said compression and power portions.

16. The engine of claim 13 wherein an igniter is mounted in the head and in communication with the chamber.

17. The engine of claim 13 wherein said one portion of each first surface is closer to the recess complemental surface than said another portion of its first surface.

18. The engine of claim 13 wherein said another section of the second surface including a non-inclined part lying substantially in an axial plane.

19. The engine of claim 18 wherein the non-inclined part extends radially from the termination at the piston axis.

* * * * *